(12) United States Patent
Morita

(10) Patent No.: US 7,029,026 B2
(45) Date of Patent: Apr. 18, 2006

(54) KNEE PROTECTION AIRBAG APPARATUS

(75) Inventor: Toshihiro Morita, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 235 days.

(21) Appl. No.: 10/654,982

(22) Filed: Sep. 5, 2003

(65) Prior Publication Data

US 2004/0075253 A1   Apr. 22, 2004

(30) Foreign Application Priority Data

Sep. 13, 2002   (JP) .......................... P2002-267723

(51) Int. Cl.
*B60R 21/20* (2006.01)
(52) U.S. Cl. ............... 280/728.3; 280/730.1; 280/732
(58) Field of Classification Search ............ 280/728.3, 280/730.1, 728.2, 732
See application file for complete search history.

(56) References Cited

U.S. PATENT DOCUMENTS

| 5,456,488 A | * | 10/1995 | Bauer ..................... | 280/728.2 |
| 5,482,313 A | * | 1/1996 | Ikeya et al. ............... | 280/728.3 |
| 5,564,732 A | * | 10/1996 | Bauer et al. ............. | 280/728.3 |
| 6,460,874 B1 | * | 10/2002 | McDonnell et al. ...... | 280/728.3 |
| 6,695,339 B1 | * | 2/2004 | Hayashi ................... | 280/738.3 |
| 6,715,789 B1 | * | 4/2004 | Takimoto et al. ........ | 280/730.1 |

FOREIGN PATENT DOCUMENTS

| EP | 1 327 564 A2 | | 7/2003 |
| JP | A-10-315894 | | 12/1998 |
| JP | 2002012122 A | * | 1/2002 |

* cited by examiner

*Primary Examiner*—Eric Culbreth
(74) *Attorney, Agent, or Firm*—Posz Law Group, PLC

(57) ABSTRACT

A knee protection airbag apparatus (S), which accommodates an airbag (73) and an inflator (62) and is opened at a vehicle rear side part thereof and has a casing assembly (22) fixedly attached to a vehicle body (B) and also has an airbag cover (46) that has a peripheral portion (47), whose upper part is assembled to a vehicle interior member (19b), and that is assembled to the casing assembly (22). The knee protection airbag apparatus (S) is mounted on a vehicle by assembling the airbag (73), the inflator (62), and the airbag cover (46) to the casing assembly (22). The airbag cover (46) is assembled to a knee panel (27) of the casing assembly (22) in such a manner as to be able to move only in a nearly upward or downward direction and in a nearly left-right direction so as to be enabled to absorb an error in assembling the airbag cover (46) to the interior member to be placed thereabove.

7 Claims, 7 Drawing Sheets

KNEE PROTECTION AIRBAG APPARATUS

The present application is based on and claims priority from Japanese Patent Application No. 2002-267723, the entire contents of which are incorporated herein by reference.

BACKGROUND OF THE INVENTION

1. Field of the Invention

The present invention relates to a knee protection airbag apparatus enabled so that an airbag to be expanded and inflated by blowing an inflating gas thereinto can protect knees of an occupant.

2. Related Art

Hitherto, there has been an apparatus for protecting a knee of an occupant, which has a configuration wherein a casing, which accommodates a folded airbag and an inflator for supplying an inflating gas to an airbag, is placed below a lower part of a column cover, which is provided beneath a steering column, to thereby cover a casing opening with an airbag cover (refer to, for example, Japanese Patent Publication No. JP-A-10-315894.).

In such a kind of an airbag apparatus, interior components, such as a lower panel of an instrument panel, are disposed around the airbag cover. According to a certain vehicle design, only an airbag system may be disposed below the lower panel.

Further, it is preferable that an airbag cover of an airbag apparatus is fixed to a casing so firmly as to withstand a force applied thereto during the inflation of an airbag.

However, in the case that the casing is fixed to a predetermined place in the vehicle, an airbag cover is sometimes mounted therein in a state in which an assembling error in assembling the airbag cover to an interior component occurs. In such a case, there are fears that a step-like portion or a gap may be caused between the airbag cover and the interior component, and that thus the external appearance of the airbag apparatus may be deteriorated.

SUMMARY OF THE INVENTION

The invention is created to solve the aforementioned problems. Accordingly, an object of the invention is to provide a knee protection airbag apparatus enabled to restrain the error in assembling an airbag cover to an interior component and to be mounted on a vehicle.

(1) To achieve the foregoing object, according to an aspect of the invention, there is provided a knee protection airbag apparatus that is configured to be mounted in a vehicle and disposed in front of a knee of an occupant seated in a seat, and that has a casing, which is opened at a vehicle rear side part thereof and fixedly mounted on a vehicle body and accommodates a folded knee protection airbag and an inflator supplying an inflating gas to the airbag, and an airbag cover, which is assembled to the casing in such a way as to be able to move in three directions, that is, an upward-downward direction, a left-right direction, and a front-rear direction, and which has a door portion that covers an opening of the casing and is enabled to be opened when the airbag is expanded and inflated, and also has a peripheral portion, which is disposed around the door portion and has an upper part that adjoins a vehicle interior component when mounted in the vehicle, and a knee panel, which is assembled to the vehicle body and has an opening receiving the casing. In this airbag apparatus, an upper side portion of the airbag cover is locked to the adjoining interior component. Further, a lower side portion of the airbag cover is locked to the knee panel in such a manner as to be able to move substantially only in the upward-downward direction and the left-right direction.

(2) Preferably, the airbag may have a locking member provided in the peripheral portion. The knee panel has a locking hole, which penetrates therethrough and is placed at a position corresponding to the locking member. The locking member has a shaft portion, which penetrates through the locking hole and is enabled to move in the locking hole only in a nearly upward-downward direction and in a nearly left-right direction, and also has a locking portion and an abutting portion, which are enabled to sandwich a periphery of the locking hole between both front and rear sides.

(3) Preferably, the locking member of the airbag cover may have the shaft portion that is elastically deformable. The locking portion is formed at a tip end part of the shaft portion, while the abutting portion is formed at a proximal end part of the shaft portion.

(4) Preferably, the airbag may have a lock receiving part provided in the peripheral portion. The knee panel has a locking hole placed at a position corresponding to the lock receiving part in such a manner as to penetrate therethrough. The lock receiving portion of the airbag cover and the knee panel are locked by the locking member. The locking member has a shaft portion that penetrates through the locking hole and is enabled to move in the locking hole only in a nearly upward-downward direction and a nearly left-right direction.

(5) Preferably, the knee panel, the casing, the airbag, the inflator, and the airbag cover may be mounted in the vehicle by being assembled into one assembly.

(6) Preferably, the knee panel may be constructed in such a way as to be integral with the casing.

(7) According to another aspect of the invention, there is provided a knee protection airbag apparatus that is configured to be mounted in a vehicle and disposed in front of a knee of an occupant seated in a seat, and that has a casing, which is opened at a vehicle rear side part thereof and fixedly mounted on a vehicle body, for accommodating a folded knee protection airbag and an inflator supplying an inflating gas to the airbag, and that also has an airbag cover, which is assembled to the casing, having a door portion, which covers an opening of the casing and is enabled to be opened when the airbag is expanded and inflated, and also having a peripheral portion, which is disposed around the door portion and has an upper part that adjoins a vehicle interior component when mounted in the vehicle. In the knee protection airbag apparatus, an upper side portion of the airbag cover is assembled to the casing in such a manner as to be able to move in three directions including an upward-downward direction, a left-right direction, and a front-rear direction. Further, a lower side portion of the airbag cover is assembled to the casing in such a way as to be able to move only in a nearly upward-downward direction and a nearly left-right direction.

In the knee protection airbag apparatus of the invention, an upper side portion of the airbag cover is locked in such a way as to be able to move in three directions, that is, an upward-downward direction, a left-right direction, and a front-rear direction. Thus, even when the airbag cover is mounted in the vehicle in a state in which an error in assembling the airbag cover to an interior component placed thereabove occurs, the airbag cover can move with respect to the knee panel in such a manner as to absorb the occurred assembling error and as not to cause a feeling of incongruity between the interior component disposed thereabove and the peripheral portion. Further, because a lower side portion of the airbag cover is positioned and locked to the knee panel in such a way as to regulate the front/rear movement of the airbag, a front-rear backlash of the airbag can be restrained from occurring after the knee protection airbag apparatus is mounted in the vehicle.

Therefore, according to the knee protection airbag apparatus of the invention, a knee protection airbag apparatus can be mounted in a vehicle by preventing an occurrence of an error in assembling the airbag cover to the interior component. Further, a favorable external appearance design of the interior component, such as the instrument panel and the airbag cover can be realized. Moreover, an occurrence of front-rear backlash of the airbag cover can be restrained. Thus, the generation of abnormal sounds due to the chattering of the airbag cover, which is caused by vibrations thereof during the vehicle runs, can be suppressed.

Further, according to the knee protection airbag apparatus of the invention, the locking member disposed at the peripheral portion of the airbag cover is inserted into the locking hole provided in the knee panel and then locked by pinching the periphery of the locking hole from both sides thereof by the locking portion and the abutting portion. Thus, the airbag cover can be assembled to the knee panel in such a way as to absorb an error in assembling to the airbag cover to the interior component. Further, the airbag cover can be assembled to the knee panel only by disposing the locking member at the peripheral portion of the airbag cover. Consequently, a structure for assembling the airbag to the knee panel can be simplified.

Furthermore, according to the knee protection airbag apparatus of the invention, the airbag cover can be assembled to the knee panel by inserting the locking member disposed at the peripheral portion of the airbag cover while bending the locking member. Consequently, an operation of assembling the airbag cover to the knee panel can easily be performed.

Alternatively, according to the knee protection airbag apparatus of the invention, the shaft portion of the locking member is inserted into the locking hole provided in the knee panel and then locked to the lock receiving portion disposed at the peripheral portion of the airbag cover. Thus, the airbag cover can be assembled to the knee panel in such a manner as to absorb an error in assembling to the airbag cover to the interior component. Further, the locking hole is provided in the knee panel. The lock receiving portion is disposed at the peripheral portion of the airbag cover. The airbag cover is assembled to the knee panel by the locking member. Consequently, the airbag cover can tightly be assembled to the knee panel.

Further, according to the knee protection airbag apparatus of the invention, the knee panel, the casing, the airbag, the inflator, and the airbag cover can be mounted in the vehicle after assembled into a single assembly. Consequently, the process of assembling the knee protection airbag apparatus to the vehicle can be simplified.

Furthermore, according to the knee protection airbag apparatus of the invention, the knee panel is constructed in such a way as to be integral with the casing. Consequently, the structure for assembling the knee panel and the casing to the vehicle can be simplified. Moreover, the number of steps of the assembling process and that of fastening components can be reduced.

Alternatively, according to the knee protection airbag apparatus of the invention, the upper side portion of the airbag cover is assembled to the casing in such a manner as to be able to move in three directions, that is, an upward-downward direction, a left-right direction, and a front-rear direction. Thus, even when the airbag cover is mounted in the vehicle in a state in which an error in assembling the airbag cover to an interior component placed thereabove occurs, the airbag cover can move with respect to the casing in such a manner as to absorb the occurred assembling error and as not to cause a feeling of incongruity between the interior component disposed thereabove and the peripheral portion. Further, because a lower side portion of the airbag cover is positioned and assembled to the casing in such a way as to regulate the front/rear movement of the airbag, a front-rear backlash of the airbag can be restrained from occurring after the knee protection airbag apparatus is mounted in the vehicle.

DETAILED DESCRIPTION OF THE PREFERRED EMBODIMENTS

Hereinafter, an embodiment of the invention is described with reference to the accompanying drawings.

Figure 1:
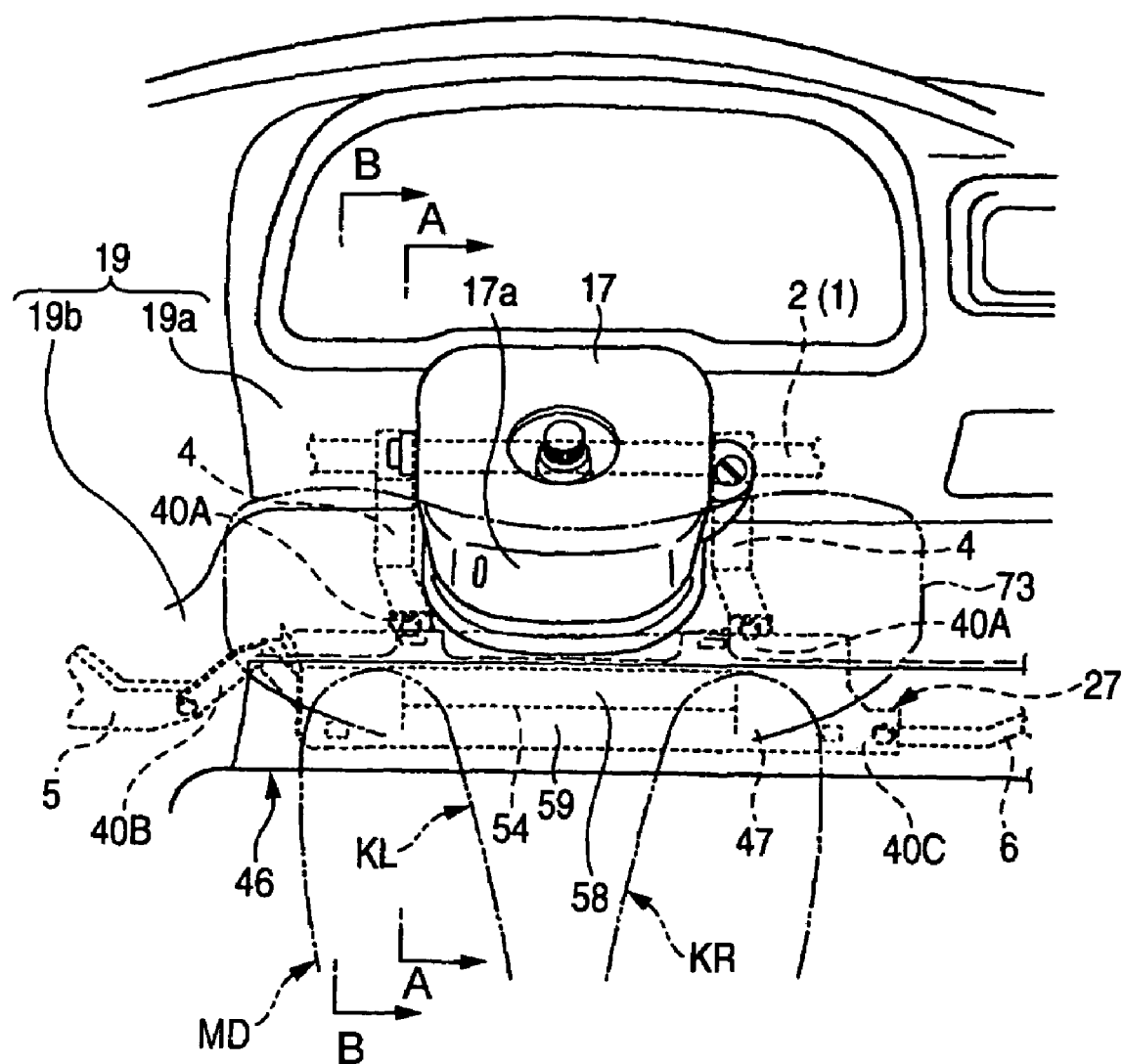
FIG. 1 is a schematic view, taken from the rear of a vehicle, and illustrating the used condition of a knee protection airbag apparatus that is an embodiment of the invention.
Figure 2:
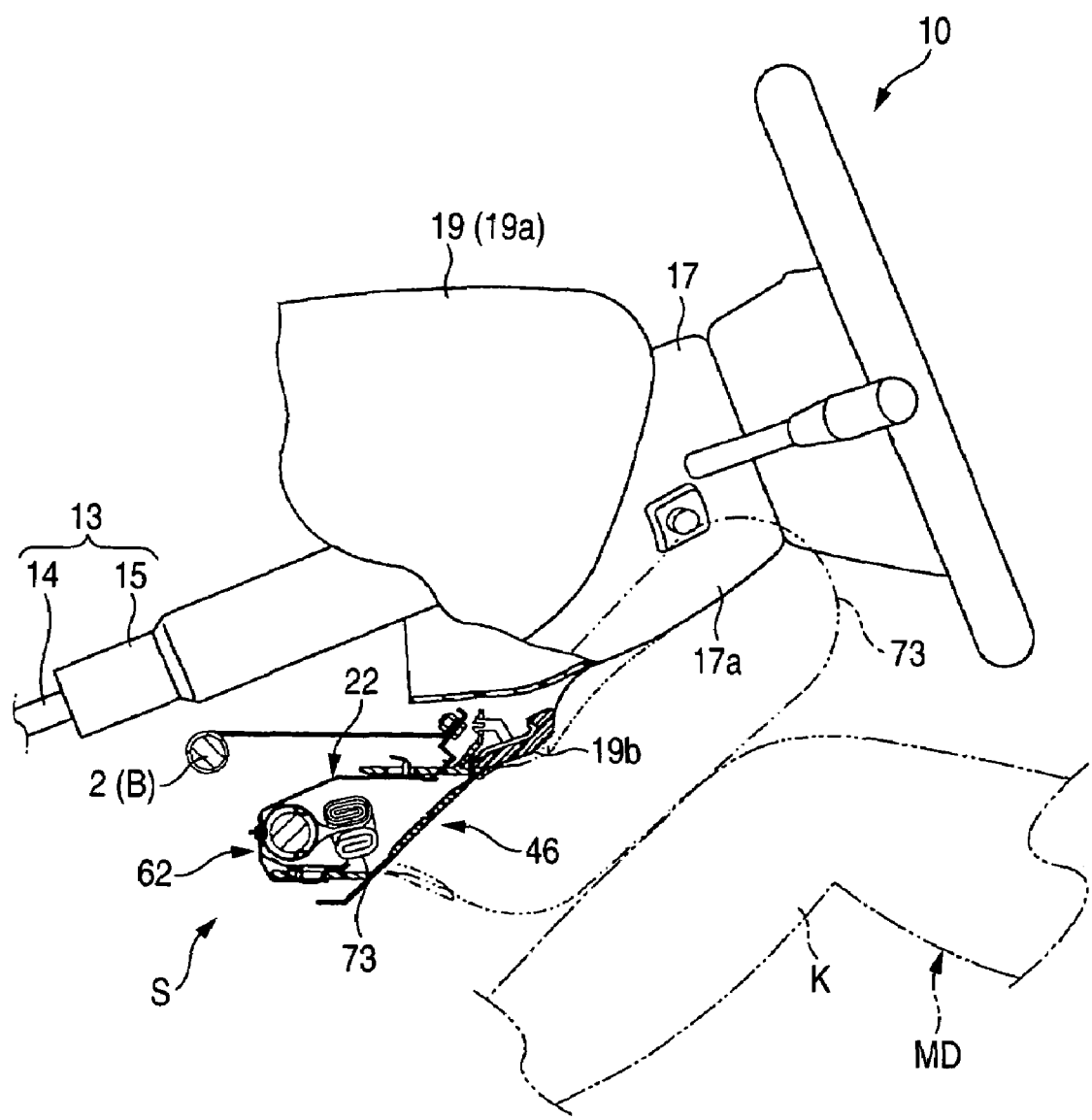
FIG. 2 is a schematic sectional view, taken along line A—A of FIG. 1, illustrating the assembled condition of the knee protection airbag apparatus that is the embodiment of the invention.

As shown in FIGS. 1 and 2, a knee protection airbag apparatus S, which is an embodiment of the invention, is disposed below a steering column 13.

Incidentally, the "upward", "downward", "left", "right", "front", and "rear" directions referred to in the present specification respectively correspond to the "upward", "downward", "left", "right", "front", and "rear" directions of a vehicle in which the knee protection airbag apparatus S is mounted.

As shown in FIG. 2, the steering column 13 comprises a main shaft 14, which is connected to a steering wheel 10, and a column tube 15 covering the periphery of the main shaft 14. A tilting mechanism (not shown), which adjusts an angle of a ring surface of the steering wheel 10, and a telescopic mechanism (not shown) enabled to move the steering wheel 10 in an axial direction of the shaft 14 and to stop the steering wheel 10 are disposed between the main shaft 14 and the column tube 15.

As shown in FIGS. 1 and 2, a column cover 17 is a nearly quadrangular prism made of a synthetic resin, and disposed along the direction of an axis of the steering column 13 in such a manner as to cover the steering column below the steering wheel 10. That is, the column cover 17 is disposed by being inclined upwardly and rearwardly so that the vehicle-front-side portion thereof is disposed at a lower place, while the vehicle-rear-side portion thereof is disposed at an upper place. Further, the bottom surface 17a of a part projecting from the instrument panel 19 in the column cover 17 is shaped nearly like a rectangle in such a way as to have a surface curved and inclined backwardly and upwardly in the front-rear direction of the vehicle.

As shown in FIGS. 1 to 5, the knee protection airbag apparatus S comprises an folded airbag 73, an inflator 62 for supplying an inflating gas to the airbag 73, a casing assembly 22, which accommodates the folded airbag 73 and the inflator 62 and is opened at a vehicle rear side part thereof, and an airbag cover 46, which covers the vehicle rear side part of the casing assembly 22. Further, in the knee protection airbag apparatus S according to the embodiment, the airbag 73, the inflator 62, and the airbag cover 46 are integrally assembled to the casing assembly 22. The knee protection airbag apparatus S thus formed into an assembly is mounted in a vehicle by being attached to a vehicle body B. Although the knee protection airbag apparatus S according to this embodiment is mounted in the vehicle by being put into a state in which the airbag apparatus S is integrally formed into an assembly, in the case of not considering workability in assembling the knee protection airbag apparatus S to the vehicle, the airbag apparatus S may be mounted therein by employing a method of sequentially assembling constituent components of the knee protection airbag apparatus S to the vehicle.

As shown in FIGS. 1 to 5, the casing assembly 22 is made of sheet metal and disposed at a lower portion of the steering column 13. The casing assembly 22 comprises a casing 23 and a knee panel 27, which are formed into separate elements. The casing 23 and the knee panel 27 are integrally formed by fixedly welding a fixing portion 32 (to be described later) of the knee panel 27 to a circumferential wall portion 24 (to be described later) of the casing 23. Although the integration of the casing 23 and the knee panel 27 is achieved in the embodiment by fixedly welding, a method of integration thereof is not limited thereto. Ordinary fastening methods using sets of bolts and nuts, rivets, or adhesive agents may be employed when satisfactory strength is obtained.

The casing 23 comprises a peripheral wall portion 24, which is shaped like a nearly quadrangular prism and opened in a vehicle rear side part thereof, and also comprises a bottom wall portion 25 that closes up the vehicle front side part of the peripheral wall portion 24. Further, the casing 23 is disposed so that the direction of width of the peripheral portion 24 is set to be an approximately horizontal direction. A plane of an opening provided in the peripheral wall portion 24 is inclined so that a lower part thereof is positioned at a vehicle front side portion. That is, in the embodiment, an upper wall part 24a and a lower wall part 24b face each other in an upward-downward direction of a peripheral wall portion 24. The dimension of front-rear width of the upper wall part 24a is set to be larger than that of front-rear width of the lower wall part 24b, so that the upper wall part 24a of the peripheral wall projects from the lower wall part 24b toward a vehicle rear side. An insertion hole 24c, through which an end portion of a body 63 (to be described later) of an inflator 62 can be passed, is formed in the peripheral wall portion 24 (see FIG. 5). Further, an insertion hole 25a, through which a bolt 66 (to be described later) of the inflator 62 is passed, is formed in the bottom wall portion 25.

The knee panel 27 is enabled to support a vehicle front side portion of the airbag 73 during expanded and inflated. The knee panel 27 comprises a body portion 28, an attaching portion 40 for attaching the casing 22 to a vehicle body 1, and assembling portions 34 and 37 for assembling the airbag cover 46. Incidentally, in the case of not considering workability in processing the casing assembly 22, the assembling portions 34 and 37 may be provided not at the knee panel 27 but on the casing 23.

The body portion 28 extends from the circumferential edge of an opening 23a of the casing 23 and is shaped nearly like a rectangle. The body portion 28 has a fitting-into hole 29 provided at a place corresponding to the opening 23a of the casing 23 so that the fitting-into hole 29 is communicated with the opening 23a and that a peripheral edge part of the opening 23a provided in the peripheral wall portion 24 of the casing 23 can be fitted thereinto. Further, a fixing portion 32 is disposed on the peripheral edge of the inserting-into hole 29 in such a manner as to protrude toward the vehicle front side and as to be fixed to the outer circumferential surface of a part in the vicinity of the opening 23a provided in the peripheral wall portion 24. In the case of the embodiment, this fixing portion 32 is provided nearly over the entire circumferential edge of the fitting-into hole 29. Incidentally, each of parts 32c and 32d respectively provided on the left and right sides of the fixing portion 32 is fixed to the peripheral wall portion 24 in the vicinity of an end thereof. The parts 32c and 32d are formed so that a gap is provided between the proximal end-side part 32e and the peripheral wall portion 24. A plurality of through holes 30 each opened nearly like a rectangle are formed in a part in the neighborhood of an upper part of the fitting-into hole 29 of the body portion 28 in such a way as to penetrate therethrough. In the illustrated embodiment, there are four through holes 30. These through holes 30 are provided so as to be passed through assembling pieces 49 (to be described later) of the airbag cover 46.

The assembling portions 34 and 37 are provided in the fixing portion 32 by being extended from parts 32a and 32b, which are placed at the side of the upper wall portion 24a and at the side of the lower wall portion 24b, respectively. Each of locking pawl portions 34 is provided as an assembling portion at the part 32a at the side of the upper wall portion 24a, while each of locking projections 37 is provided as an assembling portion at the part 32b at the side of the lower wall portion 24b.

Each of the locking pawl portions 34 is configured in such a way as to upwardly project from the part 32a provided at the side of the upper wall portion 24a and as to be nearly L-shaped by bending a tip end 34a thereof in such a manner as to be away from the opening 23a of the casing 23. A plurality of such locking pawl portions (incidentally, in the embodiment, 4 locking pawl portions) 34 are provided along a lateral direction. These locking pawl portions 34 are configured in such a way as to be locked to the peripheral edges of the locking hole portions 49a respectively formed in the assembling pieces 49 of the airbag cover 46.

Each of the locking projections 37 is configured in such a way as to downwardly project from the associated part 32b provided at the side of the lower wall portion 24b. A plurality of such locking projections 37 (incidentally, in the embodiment, 4 locking projections 37) are provided along a lateral direction. Each of the locking projections 37 is enabled to pass through a locking hole portion 50a formed in an associated assembling piece 50 (to be described later) formed in the airbag cover 46, and is assembled by a holding member 43, which is separated from the knee panel 27, to the associated locking hole portion 50a. Moreover, each of the locking projections 37 has a projecting portion 37a that downwardly projects from the assembling piece 50. An insertion hole 37b, through which an associated insertion portion 43d of the holding member 43 is inserted, is formed in each of the projecting portion 37a in such a way as to penetrate therethrough.

The holding member 43 is formed from a sheet metal, and provided at a lower part of the casing 23 in such a manner as to have a nearly L-shaped section and as to comprise a longitudinal plate portion 43a and a transversal plate portion 43c extending from the bottom of the longitudinal plate portion 43a to the vehicle rear side. An attaching hole 43b, through which the bolt 66 of the inflator 62 is inserted, is formed in the longitudinal plate 43a. In the transversal plate portion 43c, the insertion portions 43d, which can be inserted into the insertion holes 37b formed in the projecting portion 37a of the locking projection 37, are formed like comb teeth. That is, the holding member 43 is provided and fixed like a bar between the assembling piece 50 and the projecting portion 37a of each of the locking projections 37 by inserting each of the insertion portions 43d into the associated insertion hole 37b. Consequently, each of the locking projections 37 is prevented from slipping off the associated locking hole 50a. Further, the holding member 43 is fixed to the casing 23 together with the inflator 62 by utilizing the bolt 66 and a nut 68, which are used for fixing the inflator 62 to a casing body 23.

In the embodiment, the attaching portion 40 is formed at each of four corners of the peripheral edge of the body portion 28. An attaching hole 40a for bolting an associated attaching portion to the body 1 is formed in each of the attaching portions 40. As shown in FIG. 1, brackets 4, 5, and 6 are provided on the body 1, to which each of the attaching portions 40 is attached. The brackets 4, 4 for attaching upper attaching portions 40A, 40A thereto are connected to an instrument panel reinforcement 2 at the side of the body 1. Further, the brackets 5 and 6 for attaching lower attaching portions 40B and 40C are connected to a center brace (not shown) and a front body pillar (not shown) at the side of the body 1. Incidentally, in the case of the embodiment, the attaching portion 40B is formed in such a way as to be separated from the body portion 28. However, the attaching portion 40B is provided in such a manner as to be integral with the body portion 28 by fixedly welding an end part thereof to the body portion 28 (see FIG. 5).

The airbag cover 46 is formed from a thermoplastic elastomer, such as an olefin-based polymer, in such a manner as to be able to cover the vehicle rear side part of the casing opening 23a. The airbag cover 46 is formed in such a way as to be separated from the instrument panel 19 serving as an interior member. The airbag cover 46 is placed below a lower panel 19b, which is provided around the peripheral edge of the column cover 17, of the instrument panel consisting of an upper panel 19a and the lower panel 19b (see FIG. 1). Further, an attaching portion 53 having an attaching hole 56 is provided in the airbag cover 46. A clip 19c is provided in the lower panel 19b. The airbag cover 46 and the lower panel 19b are fixed and positioned by inserting the clip 19c through the attaching hole 56 (see FIG. 3). In the case of the embodiment, the airbag cover 46 and the lower panel 19b are provided in such a manner as to become design change points in a vehicle rear side surface (see FIG. 3). Moreover, the airbag cover 46 comprises a door arrangement portion 48, which is provided in the vicinity of the opening 23a of the casing assembly 22, and a peripheral portion 47 provided on the peripheral edge of the door arrangement portion 48.

The door arrangement portion 48 comprises a door portion 57, and top, bottom, left, and right side wall portions 49, 50, 52, and 51 provided in the proximity of the peripheral edge of the door portion 57, as viewed in the figure.

The door portion 57 is formed in such a way as to be shaped like a nearly rectangular plate, which is slightly larger than the opening 23a of the casing assembly 22, and as to cover the opening 23a. In the case of the embodiment, the door portion 57 comprises two sub-door portions, that is, an upper sub-door portion 58 adapted to upwardly open, and a lower sub-door portion 59 adapted to downwardly open. Further, the door portion 57 has hinge parts 55 that are respectively provided on the top and the bottom thereof and that serve as centers of turn of during the upper sub-door portion 58 and the lower sub-door portion 59 open. A thin to-be-broken portion 54 is provided at a part, which is nearly H-shaped as viewed from the vehicle rear side, around the upper sub-door portion 58 and the lower sub-door portion 59 (see FIG. 5).

The top wall portions 49, the bottom wall portion 50, the left side wall portion 51, and the right side wall portion 52 are provided in such a way as to adjoin the outer peripheral side of the casing 23, and as to project to the vehicle front side. Further, the top wall portions 49 provided in the vicinity of the upper wall part 24a, and the bottom wall portion 50 provided in the proximity of the lower wall part 24b are used as the assembling pieces for assembling the airbag cover 46 to the case assembly 22. Incidentally, in the case of the embodiment, each of the top wall portions 49 and the bottom wall portion 50 is provided on the outer peripheral side of the associated fixing part 32a or 32b of the knee panel 27. Further, each of the left side wall portion 52 and the right side wall portion 51 is provided between the peripheral wall portion 24 of the casing 23 and the base-side part 32e positioned at the side of the associated fixing part 32c and 32d of the knee panel 27 (see FIGS. 3 and 5).

A plurality of the top wall portions (in the embodiment, 4 top wall portions) 49 serving as the assembling pieces are provided along the lateral direction in such a way as to respectively correspond to the locking pawl portions 34. Each of the top wall portions 49 has a locking hole portion 49a opened in such a manner as to be shaped nearly like a rectangle and as to be used for locking the associated locking pawl portion 34 thereto. Further, the dimension of lateral width of each of the top wall portions 49 is set to be a value enabling each of the top wall portions 49 to be passed through the associated through hole 30 provided in the knee panel 27. The bottom wall portion 50 is shaped nearly like a rectangular plate, and has a plurality of locking hole portions (in the embodiment, 4 locking hole portions) 50a, which are opened nearly like rectangles and used for locking the locking projections 37.

Further, each of the assembling pieces 49 and 50, the locking hole portions 49a and 50a, and the locking pawl portions 34 and the locking projections 37 is formed so that when the airbag cover 46 is assembled to the case assembly 22, the airbag cover 46 can move with respect to the case assembly 22 in three directions, that is, an upward-downward direction, a left-right direction, and a front-rear direction.

Figure 3:
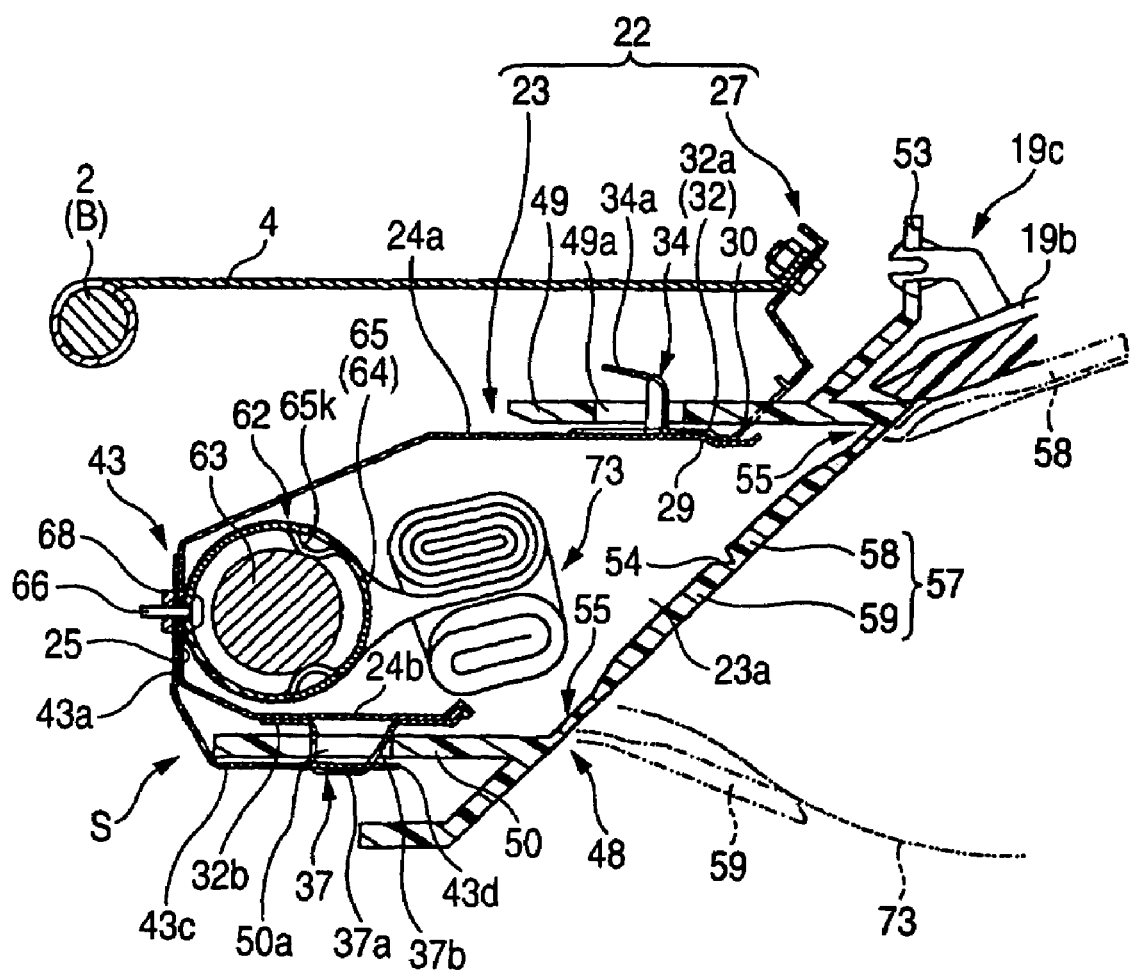
FIG. 3 is a schematic enlarged sectional view, taken in the front-rear direction of the vehicle and along line A—A of FIG. 1, illustrating the assembled condition of the knee protection airbag apparatus that is the embodiment of the invention.
Figure 4:
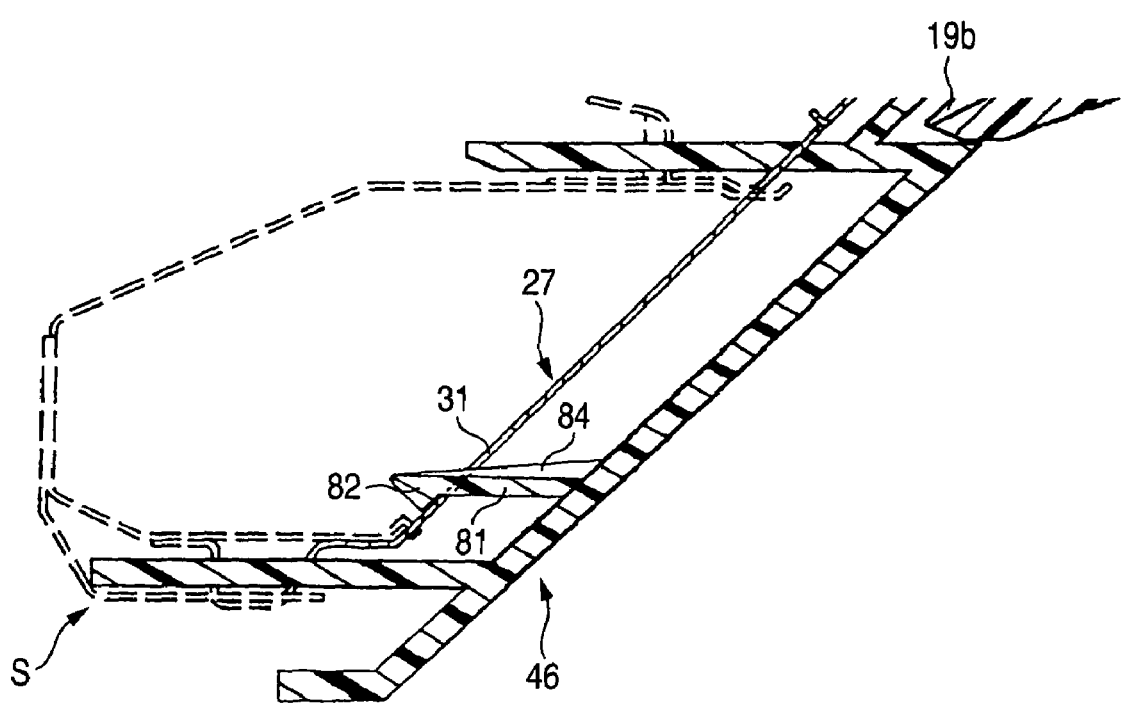
FIG. 4 is a schematic enlarged sectional view, taken in the front-rear direction of the vehicle and along line B—B of FIG. 1, illustrating the assembled condition of an airbag cover and a casing assembly, which are used in the knee protection airbag apparatus that is the embodiment of the invention.

Practically, as shown in FIG. 3, the thickness in the upward-downward direction of each of the top wall portions 49 is set to be smaller than the length of a part straightly extending in the upward-downward direction of the locking pawl portions 34 in the casing assembly 22. Further, the length in the front-rear direction of each of the locking hole portions 49a is set to be larger than the length in the front-rear direction of a part straightly extending in the upward-downward direction of the locking pawl portions 34 in the casing assembly 22. The width in the left-right direction of each of the locking hole portions 49a is set to be larger than the width in the left-right direction of a part straightly extending in the upward-downward direction of each of the locking pawl portions 34 in the casing assembly 22. That is, during a state in which each slip-off preventing portion 34a is locked by the associated locking pawl portion 34 to the peripheral edge of the associated locking hole portion 49a, the top wall portions 49 are assembled to the casing assembly 22 in such a way as to be able to move in the upward-downward direction, the left-right direction, and the front-rear direction. Incidentally, the length in the front-rear direction of the slip-off preventing portion 34a is set to be smaller than the length in the front-rear direction of the associated locking hole portion 49a in such a manner as to be able to be inserted into this locking hole portion 49a.

Further, as shown in FIG. 3, the thickness in the upward-downward direction of the bottom wall portion 50 is set to be smaller than the length in the upward-downward direction of a part between the top surface of the insertion portion 43d in the locking projection 37, which is in a state permitting the insertion portion 43d of the holding member 43 to intervene between the wall portion 50 and the projection 37, and the bottom surface of the knee panel 27. Moreover, the length in the front-rear direction of each of the locking hole portions 50a is set to be larger than the maximum length in the front-rear direction of the associated locking projection 37. Furthermore, the width in the left-right direction of each of the locking hole portions 50a is set to be larger than the width in the left-right direction of the associated locking projection 37. That is, during a state in which the holding member 43 is locked to the peripheral edges of the locking hole portions 50a, the bottom wall portion 50 is assembled to the casing assembly 22 in such a way as to be able to move in three directions, namely, an upward-downward direction, a left-right direction, and a front-rear direction.

Figure 5:
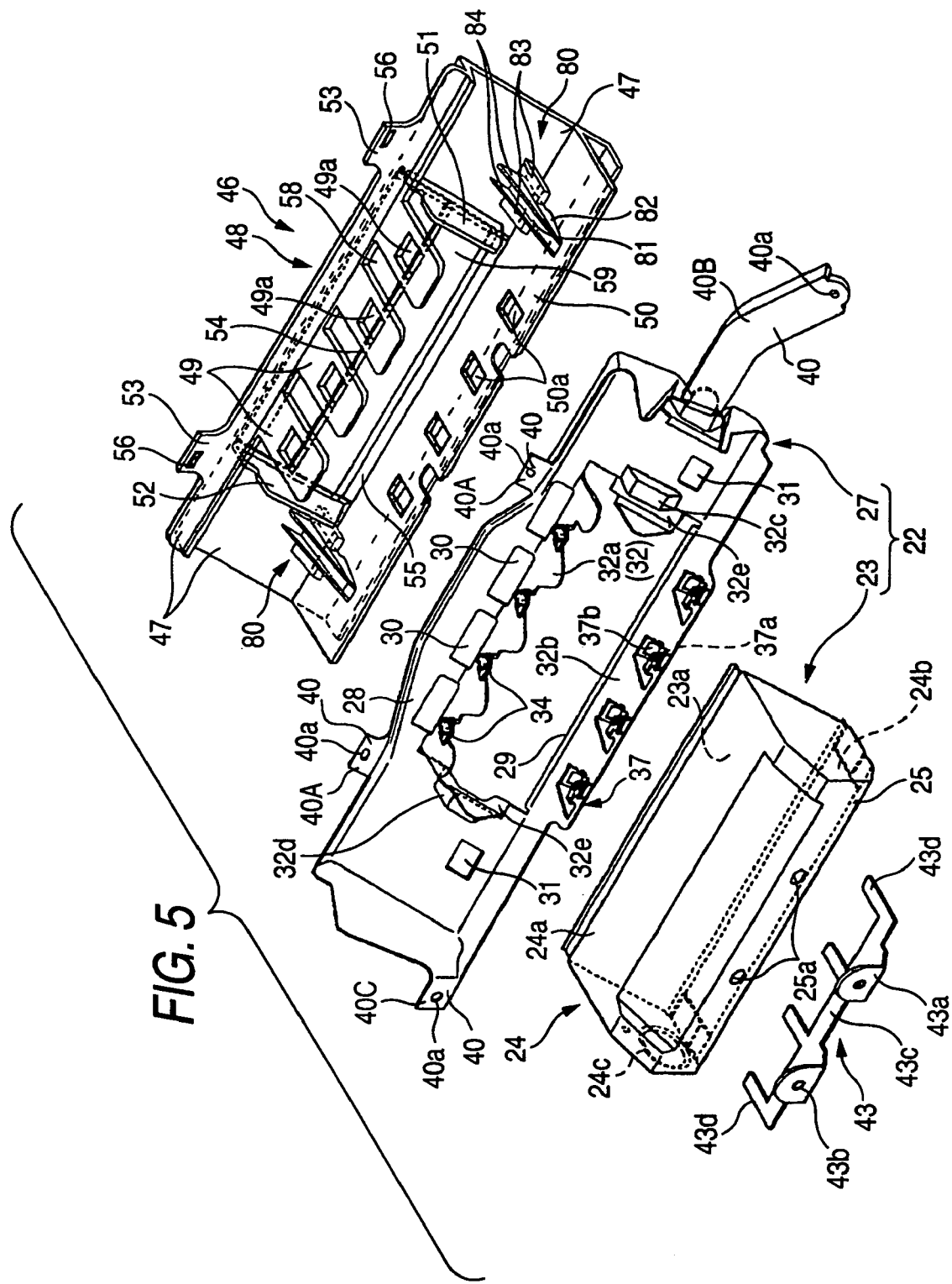
FIG. 5 is an exploded perspective view illustrating the airbag cover and the casing assembly, which are used in the knee protection airbag apparatus that is the embodiment of the invention.

Furthermore, as shown in FIG. 5, the airbag cover 46 has a locking member 80 provided on a bottom side portion thereof. A locking shaft portion 81 and reinforcing ribs 84 provided at both upper left and right ends of the locking shaft portion 81 are inserted into and through the locking holes 31 of the knee panel 27 by simultaneously being bent. Then, the periphery of each of the locking holes 31 is pinched by a locking pawl portion 82 and an abutting portion 83 from both front and rear sides, so that the airbag cover 46 is locked thereto. The width in the upward-downward direction of a part, which extends in front of the abutting portion 83, of each of the locking member 80 is set to be smaller than the relative length in the upward-downward direction of the associated locking hole 31. Moreover, the width in the left-right direction of such a part is set to be smaller than the length in the left-right direction of the locking hole 31. That is, the airbag cover 46 is assembled to the casing assembly 22 so that during a state in which each of the locking members 80 is locked to the peripheral edge of the associated locking hole 31, the airbag cover 46 can move only in the nearly-upward-downward direction and the nearly-left-right direction. Needless to say, each of locking pawl portions 82 has an engaging margin part sufficient to the extent that each of the locking pawl portions 82 is prevented from slipping off the associated locking hole when the airbag cover 46 upwardly or downwardly moves with respect to the casing assembly 22. Incidentally, although a total of two locking members 80 are provided in the embodiment in such a way as to be respectively placed at both the left and right lower parts of the peripheral portion 47 in the airbag cover 46, the positions and the number of the locking members 80 maybe changed as needed. Further, as long as each of the locking shaft portions 81 has a sufficient restoring force against a bending force applied thereto when the airbag cover 46 is assembled to the casing assembly 22, the reinforcing ribs 84 are dispensable. Moreover, although each of the locking pawl portions 82 is shaped in the embodiment so that the engaging margin part projects downwardly, the projecting direction of the margin part is not limited thereto. As long as the locking members 80 can be locked to the edges of the locking holes 31, any direction, such as an upward direction, a leftward direction, a rightward direction, and an oblique direction, may be employed as the projecting direction of the margin part. Alternatively, a plurality of locking pawl portions may be formed from the combination of those respectively having margin parts projecting in such directions. Furthermore, although the abutting portions 83 are formed at both left and right sides in such a way as to be integral with the locking members 80, respectively, the configuration of the abutting portions 83 is not limited thereto. The abutting members may be configured in such a manner as to be independent of the locking members 80. Further, the positions and the number of the abutting members may be changed as needed.

These dimensions employed in the embodiment are set so that the airbag cover 46 is assembled to the casing assembly 22 in such a way as to be able to absorb an error in assembling thereof to the lower panel 19b to be placed thereabove when the knee protection airbag apparatus S is mounted in the vehicle.

As shown in FIGS. 2 to 3, the inflator 62 is configured in such a way as to be of what is called the cylinder type, whose axial direction is along the left-right direction of the vehicle. The inflator 62 comprises a nearly cylindrical body 63 and a diffuser 64 made of a sheet metal.

The body 63 is of the type that discharges an inflating gas by receiving an operating signal and then burning a predetermined agent in response thereto. A plurality of gas discharging ports (not shown) is provided in an outer circumferential surface of the body 63. Further, a connector for connecting lead wires (not shown), which are used for inputting operating signals, is connected to the body 63 when the inflator is mounted in the vehicle.

The diffuser 64 comprises a holding cylindrical portion 65, which is shaped nearly like a cylinder and made of a sheet metal and can cover the body 63, and a plurality of bolts (in the embodiment, two bolts) each protruding to the front of the vehicle from the holding cylindrical portion 65.

A plurality of sandwich-holding portions 65k for sandwich-holding the body 63 is provided in the holding cylindrical portion 65. Each of the sandwich-holding portions 65k is configured so that both sides thereof, which extend along an axial direction of the holding cylindrical portion 65, are cut out and plastically deformed in such a way as to be bent in the holding cylindrical portion 65. The body 63 can be fixed to the holding cylindrical portion 65 by inserting the body 63 from the insertion hole formed in an end surface of the holding cylindrical portion 65 and further pressing each of the sandwich-holding portions 65k against the outer circumferential surface of the body 63.

Incidentally, when an airbag operating circuit mounted in the vehicle detects a front collision of the vehicle, operating signals are inputted to this inflator 62 and to the airbag apparatus (not shown) mounted in the steering wheel.

The airbag 73 is formed from a woven cloth that is made from flexible polyester or polyamide yarns. As indicated by double dashed chain lines in FIGS. 1 and 2, the shape of the airbag 73 on completion of expansion and inflation is set to be nearly like a rectangular plate. Further, the airbag 73 is shaped so that a width in the left-right direction has a value enabling the airbag 73 to protect both knees KL and KR of the driver MD. Further, in a bottom part of the airbag 73 on completion of expansion and inflation, a hold, through which each of the bolts 66 of the inflator 62 is inserted, and a hole through which the body 63 of the inflator 62 is inserted into the airbag 73, are provided. Further, the airbag 73 is attached to the casing 23 by sandwich-holding the peripheral edge of the hole, through which the bolts 66 are inserted, by the holding cylindrical portion 65 and the bottom wall portion of the casing 23.

Next, an operation of assembling this airbag apparatus S is described hereinbelow. Incidentally, in the casing 23 and the knee panel 27, the fixing portion 32 of the knee panel 27 is preliminarily and fixedly welded to the peripheral wall portion 24 of the casing 23, so that the casing assembly 22 is formed. First, the inflator 62 is accommodated in the airbag 73 so that the bolts 66 are projected from the airbag 73. Then, the airbag 73 is folded. Subsequently, the airbag 73 is wrapped by breakable wrapping film for preventing the airbag 73 from being unfolded. At that time, end portions of the bolts 66 and the body 63 are protruded from the wrapping film.

Then, each of the bolts 66 of the inflator 62 is projected from the insertion hole 25a. Moreover, an end portion of the inflator body 63 is protruded from the insertion hole 24c. Thus, the inflator 62 is accommodated in the casing 23 together with the folded air bag 73.

Then, the airbag cover 46 is assembled to the casing assembly 22. At that time, first, each of the top wall portions 49 is inserted into the associated through hole 30 formed in the knee panel 27. Each of the locking pawl portions 24 is inserted into the associated locking hole portion 49a formed in each of the top wall portions 49. Thus, the end 34a thereof is locked to the peripheral edge of the locking hole portion 49a. Thereafter, the airbag cover 46 itself is moved in such a way as to be rotated by employing a part, which is placed in the vicinity of the through hole 30 in the airbag cover 46, as the center of rotation. The locking projections 37 are inserted into the locking hole portions 50a formed in the bottom wall portion 50, respectively. Simultaneously, the locking shaft portion 81 and the reinforcing ribs 84 of each of the locking members 80 are inserted into the associated locking hole 31 of the knee panel 27 by being bent. The periphery of each of the locking holes 31 is sandwiched from both sides thereof by the locking pawl portion 82 and the abutting portion 83. Further, each of the insertion portions 43d is inserted into the insertion hole 37b of the associated projecting portion 37a projecting from the front side of the case assembly 22. Moreover, each of the bolts 66 is inserted into and through the associated attaching hole 43b of a longitudinal plate portion 43a. Then, the holding member 43 is placed, and the nut 68 is screwed onto each of the bolts 66 projecting from the holding member 43. Consequently, the airbag cover 46 can be assembled to the casing assembly 22. Thus, the knee protection airbag apparatus S can be formed.

Further, each of the attaching portions 40 of the knee panel 27 of the knee protection airbag apparatus S is attached and fixed to the body 1 by utilizing the brackets 4, 5, and 6. Simultaneously, the connector connecting the lead wires is connected to the body 63 of the inflator 62. Then, after the instrument panel 19 is attached thereto, the lower panel 19b is attached to the instrument panel 19. Moreover, the clip 19c of the lower panel 19b is locked thereto by being inserted through the attaching hole 56 provided in the attaching portion 53 of the airbag cover 46. Consequently, the knee protection airbag apparatus S can be mounted in the vehicle (see FIGS. 1 and 2).

After the knee protection airbag apparatus S is mounted in the vehicle, an operating signal is inputted to the body 63 of the inflator 62 through the lead wire, an inflating gas is discharged from the gas discharging port of the inflator 62. Then, the inflating gas flows into the airbag 73 (see FIG. 3). Subsequently, the airbag 73 inflates and breaks the wrapping film. Moreover, the airbag 73 presses the door portion 57 of the airbag cover 46 and breaks the to-be-broken portion 54, so that the upper sub-door portion 58 and the lower sub-door portion 59 are opened upwardly and downwardly, respectively, by employing the hinge portions 55 as the centers of turn thereof. Thus, as indicated by the double dashed chain lines in FIGS. 1 and 2, the airbag 73 largely and upwardly projects along the rear surface 17a of the column cover 17 by simultaneously expanding and inflating. Further, the airbag cover 46 and the casing assembly 22 are firmly assembled to each other by using the assembling pieces 49 and the assembling portions 37, and the assembling piece 50, the assembling portions 37 and the holding member 43. Therefore, the airbag cover 46 and the casing assembly 22 cannot easily be separated by impact caused when the airbag 73 expands and inflates. Incidentally, the shapes of the door portion 57 and the to-be-broken portion 54 of the airbag cover 46 are not limited thereto. These portions 57 and 54 may be formed as a nearly U-shaped single door portion employing a hinge as a bottom or top single side thereof, and a to-be-broken portion, respectively.

Further, in the knee protection airbag apparatus S according to the embodiment, the top side portion of the airbag cover 46 is assembled to the casing assembly 22 in such a manner as to be able to move in three directions, that is, an upward-downward direction, a left-right direction, and a front-rear direction. Thus, even when the central axis of the attaching hole 56 of the airbag cover 46 and that of the clip 19c of the lower panel 19b, which is placed thereabove, are misaligned and an assembling error is caused during the airbag cover 46 is assembled to the lower panel 19b, the airbag cover 46 absorbs the caused assembling error. Furthermore, the airbag cover 46 can move with respect to the lower panel 19b in such away as not to cause a feeling of incongruity between the airbag cover 46 and the lower panel 19b placed thereabove. Additionally, the bottom side portion of the airbag cover 46 is locked to the knee panel 27 by being positioned in such a manner as to be restrained from moving in the front-rear direction. Consequently, the airbag cover 46 can be restrained from backlashing in the front-rear direction after the knee protection airbag apparatus S is mounted in the vehicle.

Therefore, the knee protection airbag apparatus S according to the embodiment can be mounted in a vehicle by suppressing an error in assembling the airbag cover 46 to the interior component, such as the lower panel 19b of the instrument panel 19. Further, a favorable external appearance design of the lower panel 19b and the airbag cover 46 can be realized. Moreover, an occurrence of front-rear backlash of the airbag cover 46 can be restrained. Thus, the generation of abnormal sounds due to the chattering of the airbag cover 46, which is caused by vibrations thereof during the vehicle runs, can be suppressed.

Further, in the knee protection airbag apparatus S according to the embodiment, the assembling members 34 and 37 are provided in the casing assembly 22 as means for assembling the airbag cover 46 to the casing assembly 22. Thus, the assembling members 34 and 37 provided in the casing assembly 22 are inserted into the assembling holes 49a and 50a formed in the top and bottom wall portions (or assembling pieces) 49 and 50 of the airbag cover 46. The slip-off preventing portions 34a and 37a are locked to the peripheral edges of the assembling holes 49a and 50a. The locking shaft portion 81 and the reinforcing ribs 84 of each of the locking members 80 of the airbag cover 46 are inserted through the associated locking hole 31 of the casing assembly 22 by being simultaneously bent. Then, the locking shaft portion 81 and the reinforcing ribs 84 of each of the locking members 80 are locked by sandwiching the periphery of each of the locking holes 31 from both sides thereof by the locking pawl portions 82 and the abutting portion 83. Thus, the airbag cover 46 can be assembled to the casing assembly 22. Consequently, an operation of assembling the airbag cover 46 to the casing assembly 22 can easily be achieved. Moreover, only arranging the assembling members 34 and 37 in the casing assembly 22 and providing the top and bottom wall portions 49 and 50, which have the assembling holes 49a and 50a, and the locking members 80 in the airbag cover 46 enable the airbag cover 46 to be assembled to the casing assembly 22 in such a way as to be able to absorb an error in assembling thereof to the lower panel 19b. Consequently, an assembling structure can be simplified. Furthermore, in the case that the assembling portions 34 and 37 (to be described later) of the knee panel 27 are provided in the casing 23, that a bracket (not shown) for assembling the casing 23 to the body 1 is provided in the casing 23, and that a stay (not shown) for assembling the bracket to the body 1 is provided in the body 1, it is not always necessary to integrally form the casing 23 and the knee panel 27.

Figure 6:
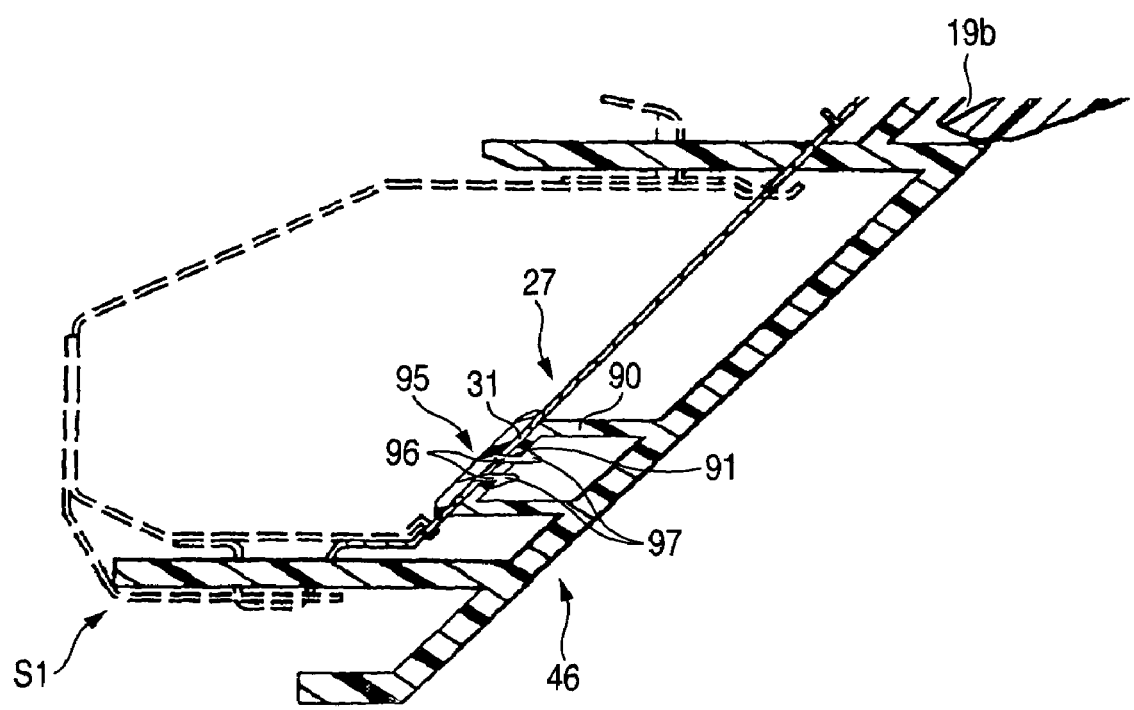
FIG. 6 is a schematic enlarged sectional view, taken in the front-rear direction of the vehicle and along line B—B of FIG. 1, illustrating the assembled condition of an airbag cover and a casing assembly, which are used in a knee protection airbag apparatus that is another embodiment of the invention.

Referring further to FIG. 6, there is shown a knee protection airbag apparatus S1, which is another embodiment of the invention. The configuration of this knee protection airbag apparatus S1 is similar to that of the aforementioned knee protection airbag apparatus S, except the airbag cover 46 and the locking member 95. In the figures, like constituent elements are designated by like reference characters. Thus, the description of such elements is omitted.

The airbag cover 46 used in the knee protection airbag apparatus S1 has a configuration similar to that of the airbag cover 46 of the aforementioned knee protection airbag apparatus S, except that the airbag cover 46 of the apparatus S1 has a lock receiving portion 90, instead of the locking member 80.

The airbag cover 46 of this embodiment is locked as follows. First, a locking member 95 is inserted through the locking hole 31 of the knee panel 27. Then, the periphery of the locking hole 31 is sandwiched by the lock receiving portion 90 and the head of the locking member 95 from both sides thereof. The locking pawl portion 97 of a locking member 95 is engaged with a locking hole portion 91 of the lock receiving portion 90. The locking member 95 has a locking shaft portion 96. The thickness in the upward-downward direction of the locking shaft portion 96 is set to be smaller than the relative length in the upward-downward direction of the locking hole 31. Moreover, the length in the left-right direction of the locking shaft portion 96 is set to be smaller than that in the left-right direction of the locking hole 31. That is, the airbag cover 46 is assembled to the casing assembly 22 in such a way as to be able to move only in the upward-downward direction and the left-right direction during a state in which the locking portion 95 is locked to the peripheral edge of the locking hole 31. Needless to say, the locking member 95 has an engaging margin sufficient to the extent that the locking member 95 is prevented from passing through the locking hole 31 when the airbag cover 46 moves in the upward-downward direction with respect to the casing assembly 22. Incidentally, although lock receiving portions are provided at a leftwardly lower part and a rightwardly lower part of the peripheral portion 47 of the airbag cover 46 in this embodiment, that is, at a total of two places, the providing position, the providing direction (that is, the orientation of the pawl portion), and the number of provided lock receiving portions may be changed as needed.

These dimensions are set so that the airbag cover 46 is assembled to the casing assembly 22 in such an away as to be able to absorb an error in assembling thereof to the lower panel 19b, which is placed thereabove, when the knee protection airbag apparatus S1 is mounted in the vehicle.

Further, even in the case of the knee protection airbag apparatus S1 according to the embodiment, the top side portion of the airbag cover 46 is assembled to the casing assembly 22 in such a way as to be able to move in three directions, that is, the upward-downward direction, the left-right direction, and the front-rear direction. Therefore, even in the case that the central axis of the mounting hole 56 of the airbag cover 46 and that of the clip 19c of the lower panel 19b are misaligned and an assembling error is caused when the airbag cover 46 is assembled to the lower panel 19b, the airbag cover 46 can move with respect to the lower panel 19b in such a way as to absorb the caused assembling error and as to prevent a feeling of congruity between the airbag cover 46 and the lower panel 19b, which is placed thereabove, from being caused. Further, because the bottom side portion of the airbag cover 46 is locked to the knee panel 27 and positioned in such away as to be restrained from moving in the front-rear direction, the airbag cover 46 can be restrained from backlashing in the front-rear direction after the knee protection airbag apparatus S1 is mounted in the vehicle. Thus, the knee protection airbag apparatus S1 can have operations and effects similar to those of the knee protection airbag apparatus S. Moreover, the airbag cover 46 can firmly be assembled to the casing assembly 22.

Figure 7:
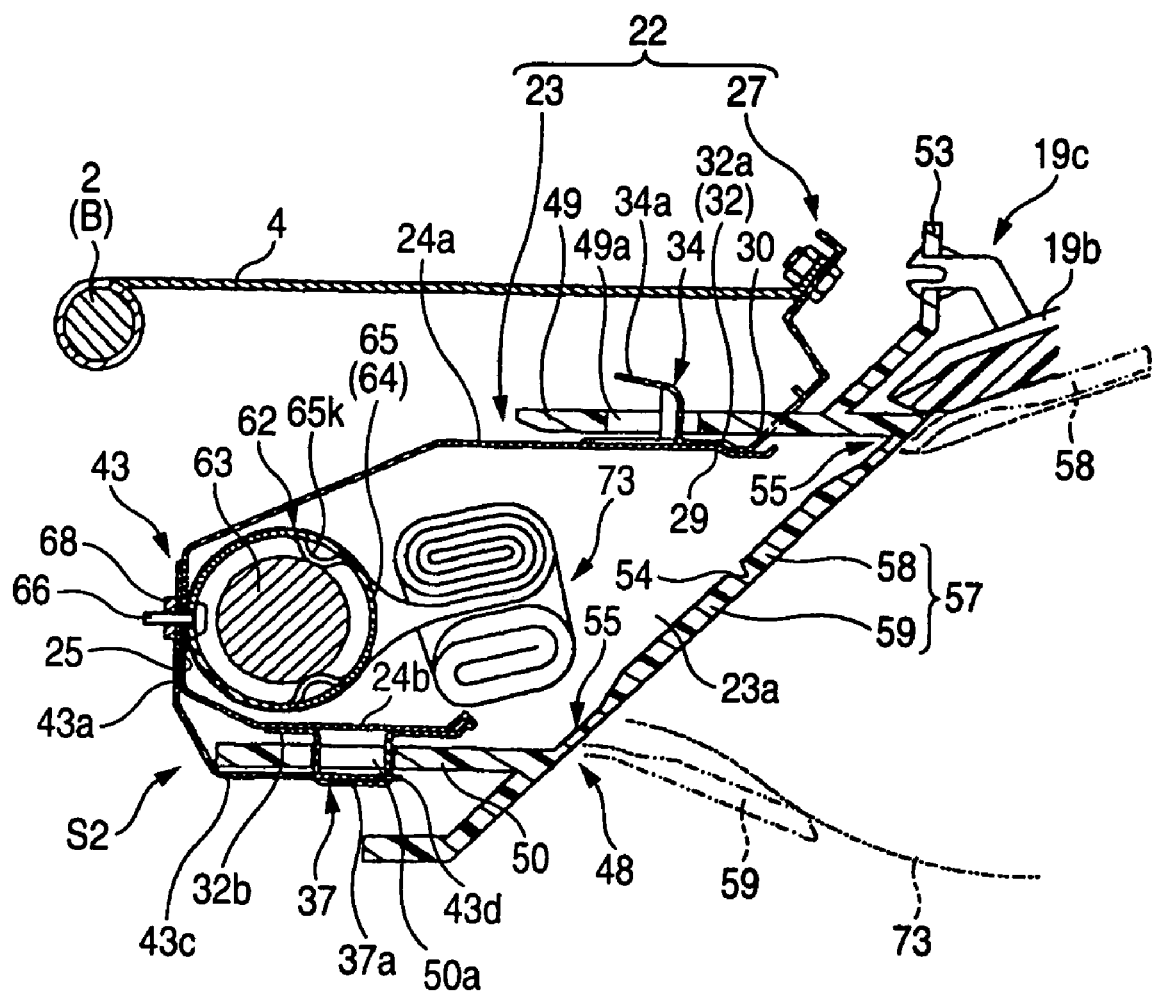
FIG. 7 is a schematic enlarged sectional view, taken in the front-rear direction of the vehicle and along line A—A of FIG. 1, and illustrating the assembled condition of an airbag cover and a casing assembly, which are used in a knee protection airbag apparatus that is still another embodiment of the invention.

Referring further to FIG. 7. there is shown a knee protection airbag apparatus S2 that is another embodiment of the invention. The configuration of the knee protection airbag apparatus S2 is similar to that of the knee protection airbag apparatus S, except an airbag cover 46 and a casing assembly 22. In the figures, like constituent elements of the apparatus S2 are designated by like reference characters. Thus, the description of such constituent elements is omitted herein.

The configuration of the airbag cover 46 used in the knee protection airbag apparatus S2 is similar to that of the airbag cover 46 of the knee protection airbag apparatus S, except that the airbag cover 46 of the knee protection airbag apparatus S2 does not have a locking member 80.

Further, the configuration of the casing assembly 22 used in the knee protection airbag apparatus S2 is similar to that of the casing assembly 22 of the knee protection airbag apparatus S, except the shape of the assembling members 37 and the fact that the casing assembly 22 does not have the locking holes 31.

The thickness in the upward-downward direction of the bottom wall portion 50 of the airbag cover 46 is set to be smaller than the length in the upward-downward direction of a part between the top surface of the insertion portion 43d in the locking projection 37, which is in a state permitting the insertion portion 43d of the holding member 43 to intervene between the wall portion 50 and the projection 37, and the bottom surface of the knee panel 27. Moreover, the length in the front-rear direction of each of the locking hole portions 50a is set to be nearly equal to the maximum length in the front-rear direction of the associated locking projection 37. Moreover, the width in the left-right direction of each of the locking hole portions 50a is set to be larger than the width in the left-right direction of the associated locking projection 37. That is, during a state in which the holding member 43 is locked to the peripheral edges of the locking hole portions 50a, the bottom wall portion 50 (thus, the airbag cover 46) is assembled to the casing assembly 22 in such a way as to be able to move only in the nearly upward-downward direction and the nearly left-right direction.

These dimensions employed in the embodiment are set so that the airbag cover 46 is assembled to the casing assembly 22 in such a way as to be able to absorb an error in assembling thereof to the lower panel 19b to be placed thereabove when the knee protection airbag apparatus S2 is mounted in the vehicle. Further, the assembling portions 34 and 37 of the knee panel 27 are provided in the casing 23. A bracket for assembling the casing 23 to the body 1 is provided in the casing 23. Alternatively, if a stay (unillustrated) for assembling the bracket to the body 1 is provided in the body 1, the knee panel 27 may be eliminated.

Incidentally, this embodiment may be employed by being combined with one of the previously described two embodiments.

Further, even in the knee protection airbag apparatus S2, the top side portion of the airbag cover 46 is assembled to the casing assembly 22 in such a way as to be able to move in three directions, that is, in the upward-downward direction, the left-right direction, and the front-rear direction. Thus, even when the airbag cover 46 is assembled to the lower panel 19b in a state in which an error in assembling the airbag cover 46 to the lower panel 19b is caused by misalignment between the central axis of the attaching portion 56 of the airbag cover 46 and the central axis of the clip 19c of the lower panel 19b to be placed thereabove, the airbag cover 46 can move with respect to the lower panel 19b in such a manner as to absorb the occurred assembling error and as not to cause a feeling of incongruity between the airbag cover 46 and the lower panel 19b disposed thereabove. Further, because a lower side portion of the airbag cover 46 is positioned in such a way as to be restrained from moving in the front-rear direction, and locked to the casing assembly 22, a front-rear backlash of the airbag cover 46 can be restrained from occurring after the knee protection airbag apparatus S2 is mounted in the vehicle. Consequently, the knee protection airbag apparatus S2 can obtain advantages similar to those of the knee protection airbag apparatus S.

Incidentally, although it has been described in the foregoing description of the embodiments that the lower panel 19b is assembled to the vehicle after the knee protection airbag apparatus S (or S1 or S2) is assembled thereto, conversely, the knee protection airbag apparatus S (or S1 or S2) may be assembled to the vehicle after the lower panel 19b is assembled to the instrument panel 19. Further, although the knee protection airbag apparatuses S, S1, and S2, which are placed in the vehicle front side so as to protect the knees K of a driver MD, have been described by way of example, the knee protection airbag apparatus of the aforementioned configuration may be placed at a position at a vehicle front side of an occupant sits in an assistant driver's seat so as to protect both the knees of the occupant that sits in the assistant driver's seat.

What is claimed is:

1. A knee protection airbag apparatus, configured to be mounted in a vehicle and disposed in front of a knee of an occupant seated in a seat, comprising:
    a casing having an opening at a vehicle rear side part thereof and fixedly mounted on a vehicle body, for accommodating a folded knee protection airbag and an inflator supplying an inflating gas to said airbag;
    an airbag cover, assembled to said casing so as to be movable in three directions including an upward-downward direction, a left-right direction, and a front-rear direction with respect to said casing, said airbag cover including
    a door portion which covers said opening of said casing and is opened when said airbag is inflated, and
    a peripheral portion which is disposed around said door portion and has an upper part that adjoins a vehicle interior component when mounted in said vehicle; and
    a knee panel, fixed to said vehicle body, having an opening into which said casing is received;
    wherein an upper side portion of said airbag cover is locked to said interior component; and
    a lower side portion of said airbag cover is locked to said knee panel so as to be movable substantially only in the upward-downward direction and the left-right direction with respect to said knee panel.

2. The knee protection airbag apparatus according to claim 1, wherein said airbag cover has a locking member provided in said peripheral portion,
    wherein said knee panel has a locking hole which penetrates though said knee panel and is placed at a position corresponding to said locking member, and
    wherein said locking member has a shaft portion, which penetrates through said locking hole and is movable in said locking hole substantially only in the upward-downward direction and the left-right direction, and has a locking portion and an abutting portion, by which a periphery of said locking hole is sandwiched from front and rear sides of said locking hole.

3. The knee protection airbag apparatus according to claim 2, wherein said shaft portion is elastically deformable, and wherein said locking portion is formed at a tip end part of said shaft portion, while said abutting portion is formed at a proximal end part of said shaft portion.

4. The knee protection airbag apparatus according to claim 1, wherein said airbag cover has a lock receiving part provided in said peripheral portion,
    wherein said knee panel has a locking hole placed at a position corresponding to said lock receiving part so as to penetrate through said knee panel,
    wherein said lock receiving part of said airbag cover and said knee panel are locked by a locking member, and wherein said locking member has a shaft portion that penetrates through said locking hole and is movable in said locking hole substantially only in the upward-downward direction and the left-right direction.

5. The knee protection airbag apparatus according to claim 1, wherein said knee panel, said casing, said airbag, said inflator, and said airbag cover are assembled into a single assembly before being mounted in said vehicle.

6. The knee protection airbag apparatus according to claim 1, wherein said knee panel is constructed so as to be integral with said casing.

7. A knee protection airbag apparatus, configured to be mounted in a vehicle and disposed in front of a knee of an occupant seated in a seat, comprising:
- a casing having an opening at a vehicle rear side part thereof and fixedly mounted on a vehicle body, for accommodating a folded knee protection airbag and an inflator supplying an inflating gas to said airbag; and
- an airbag cover, assembled to said casing, having
- a door portion which covers said opening of said casing and is opened when said airbag is inflated, and
- a peripheral portion which is disposed around said door portion and has an upper part that adjoins a vehicle interior component when mounted in said vehicle;

wherein an upper side portion of said airbag cover is assembled to said casing so as to be movable in three directions including an upward-downward direction, a left-right direction, and a front-rear direction with respect to said casing; and a lower side portion of said airbag cover is assembled to said casing so as to be movable substantially only in the upward-downward direction and the left-right direction with respect to said casing.

* * * * *